Dec. 20, 1955     G. W. RUSLER     2,727,999
PHASE SENSITIVE DEMODULATORS
Filed May 6, 1953
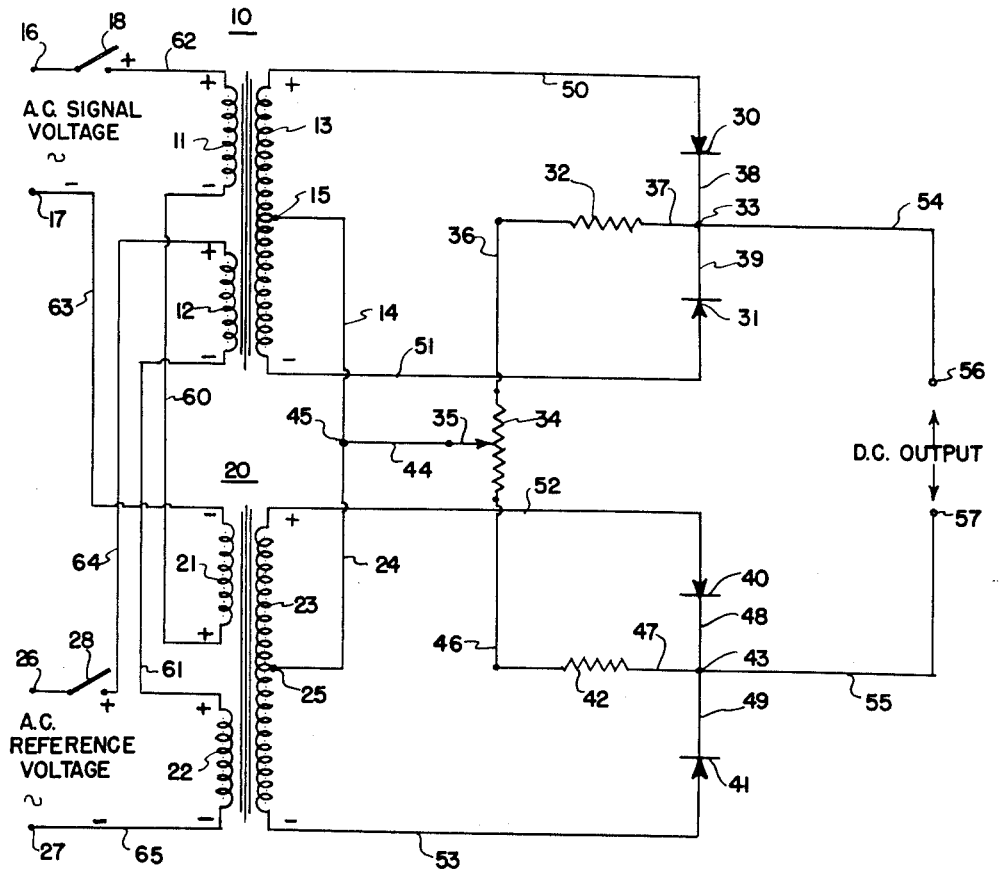
INVENTOR.
GEORGE W. RUSLER
BY
*George H Fisher*
ATTORNEY

2,727,999

PHASE SENSITIVE DEMODULATORS

George W. Rusler, Minneapolis, Minn., assignor to Minneapolis-Honeywell Regulator Company, Minneapolis, Minn., a corporation of Delaware Application May 6, 1953, Serial No. 353,377

10 Claims. (Cl. 307—43)

The invention relates generally to demodulators. More particularly this invention relates to full wave phase sensitive demodulators used to convert an A. C. signal to D. C. thus providing a D. C. output from the demodulator for application to an amplifier or other device.

An object of the invention is to provide an improved demodulator circuit for converting alternating voltages into direct voltages whose polarity and magnitude correspond to the phase and magnitude of the alternating voltages.

Another object of the invention is in providing a demodulator of the foregoing character which is of a phase sensitive full-wave character providing full wave demodulation.

A further object of the invention is to provide an improved full wave demodulator which is so constructed and arranged as to impress two alternating signals on the primary windings of transformers and thus mix the two alternating signals where in one transformer the two signals are in phase and in the other transformer the two signals are of the opposite phase, and to obtain a unidirectional output which is a function of the algebraic sums of the two input voltages.

A further object of the invention is to provide a demodulator of the foregoing character in which the output is limited to a predetermined maximum value regardless of the magnitude which the input signal attains, thus protecting a succeeding device from the possibility of being damaged from a very strong signal.

Other objects and advantages of the invention will become apparent from a consideration of the appended specification, claims and drawing.

Referring to the drawing there is shown a pair of identical transformers 10 and 20. Transformer 10 has primary windings 11 and 12 and a secondary winding 13 which has a center tap connection 15. Similarly transformer 20 has primary windings 21 and 22 and a secondary winding 23 which has a center tap connection 25. Primary windings 11 and 21 are connected in series by a lead 60 and to a source of alternating signal voltage 16 and 17 by leads 62 and 63. Switch 18 closes the circuit to windings 11 and 21 allowing them to be energized by the signal voltage. Primary windings 12 and 22 are connected in series by a lead 61 and to a source of alternating reference voltage 26 and 27 of the same frequency as the signal voltage by leads 64 and 65. Switch 28 closes the circuit to windings 22 and 12 allowing them to be energized by the reference voltage. The primary windings are so connected that when the signal voltage is in phase with and aiding the reference voltage in transformer 10, the signal voltage is opposing the reference voltage in transformer 20. If the phase of the signal voltage is reversed it will oppose the reference in transformer 10 and aid the reference voltage in transformer 20.

The demodulator also includes four rectifying devices 30, 31, 40, and 41. In one embodiment of the circuit selenium rectifiers were used, but a vacuum tube rectifier, or any other suitable rectifier could be used as well. The rectifiers are connected in pairs, one pair consisting of rectifiers 30 and 31 which have their cathodes tied together at junction 33, and the second pair consisting of rectifiers 40 and 41, having their cathodes tied together at junction 43. The anodes of rectifiers 30 and 31 are connected to opposite terminals of winding 13 by leads 50 and 51 respectively. The anodes of rectifiers 40 and 41 are connected to opposite terminals of winding 23 by leads 52 and 53 respectively. The center taps 15 and 25 of the two secondary windings 13 and 23 are electrically connected together by leads 14 and 24.

Three impedances are connected in series between the junctions 33 and 43, these being two equal resistances 32 and 42 which have a potentiometer 34 connected between them. The slider 35 of potentiometer 34 is directly connected to the center taps of the transformers through leads 44, 14 and 24. The resistors 32 and 42 are also current limiting resistances to protect the rectifiers and to place the operating point high on the operating curve of the rectifiers thus giving linearity of output as well as high output.

The cathodes of the rectifiers are therefore connected to the center taps of the transformer through several impedances; the cathodes of rectifiers 30 and 31 are connected to the center tap 15 through resistance 32 and the upper portion of potentiometer 34 to the slider 35 and leads 44 and 14. The cathodes of rectifiers 40 and 41 are connected to the center tap 25 through resistance 42, the lower portion of potentiometer 34, slider 35 and leads 44 and 24.

The D. C. output terminals 56 and 57 are connected to junctions 33 and 43 through leads 54 and 55 respectively. In one embodiment of the circuit the values of components used were as listed in the following table:

Resistance 32, 42 _____ 1000 ohms.
Resistance 34 _____ 200 ohms.
Rectifiers 30, 31, 40, 41 _____ Type BA347ZE, Fansteel Metallurgical Corp.
Reference Voltage _____ 15 volts, 400 cycles.
Signal Voltage _____ 400 cycles.

Operation

An A. C. reference voltage is applied at terminals 26 and 27 energizing series connected primary windings 12 and 22 of transformers 10 and 20 respectively upon closing of switch 28. Since the two transformers are identical an equal voltage is applied to each of the primary windings 12 and 22 and the potential built up in secondary winding 13 of transformer 10 is equal in magnitude to the potential built up in secondary winding 23 of transformer 20 thus giving equal currents in resistors 32 and 42 as will be explained later. Let us assume the instantaneous polarity to be as shown in the diagram with primary windings 12 and 22 having a positive polarity at the top end of the windings developing a positive polarity at the top end of the secondary windings 13 and 23 and a negative polarity at the lower end of the windings. In the upper section of the demodulator current then flows from the top of winding 13, through lead 50, rectifier 30, lead 38, junction 33, lead 37, resistor 32, lead 36, the upper part of potentiometer 34, slider 35, leads 44 and 14 back to the winding 13 at center tap 15. Rectifier 31 prevents any current from flowing in the lower half of winding 13 and lead 51. Current will also flow in the lower section of the demodulator from the top of winding 23, through lead 52, rectifier 40, lead 48, junction 43, lead 47, resistor 42, lead 46, lower part of potentiometer 34, slider 35, leads 44 and 24 to the center tap 25 of winding 23. Rectifier 41 prevents any current flow in the lower half of winding 23 and lead 53.

On the second half of the cycle as the instantaneous polarity of the reference voltage changes, the bottom of windings 13 and 23 become positive and the path of current flow changes. In the upper section of the demodulator current flows from the bottom of winding 13, through lead 51, rectifier 31, lead 39, junction 33, lead 37, resistor 32, lead 36, upper part of potentiometer 34, slider 35 and leads 44 and 14 back to the winding at center tap 15. Now rectifier 30 prevents any current flow in the upper half of winding 13 and lead 50. In the lower section of the demodulator current flows from the bottom of winding 23, through lead 53, rectifier 41, lead 49, junction 43, lead 47, resistor 42, lead 46, lower part of potentiometer 34, slider 35, leads 44 and 24 back to the winding at center tap 25. Now rectifier 40 prevents any current flow in the upper half of winding 23 and lead 52.

This device is constructed with resistors 32 and 42 being of equal value, however, balancing potentiometer 34 is provided in the circuit to equalize any variation in the magnitude of the two resistors 32 and 42. Thus under the preceding conditions with equal potentials developed across the secondary windings 13 and 23 and having balanced resistances in the circuits, that is the resistance of resistor 32 and the upper portion of potentiometer 34 being the same as the resistance of resistor 42 and the lower portion of potentiometer 34, equal voltages will build up across the resistances, and no D. C. potential difference will appear at the output terminals 56 and 57. This is the desired condition. If a D. C. potential difference appears at terminals 56 and 57 it is corrected by adjusting the slider 35 of balancing potentiometer 34 for a zero potential between terminals 56 and 57.

Now let us also close switch 18 thus applying the A. C. signal voltage to the device from terminals 16 and 17 to series connected transformer primary windings 11 and 21 of transformers 10 and 20 respectively. These windings are so connected that when the signal voltage is of a phase to aid the reference voltage in the first transformer 10 it is opposing the reference voltage in the second transformer 20. When the phase of the signal voltage is reversed the signal voltage then aids the reference voltage of the transformer 20 and opposes the reference voltage of the first transformer 10. The demodulator as used in a preferred embodiment of the circuit has the magnitude of the reference voltage in the range of volts and that of the signal voltage normally in the range of millivolts. The D. C. output therefore is normally in the range of millivolts. Let us for the sake of explanation assume the magnitude of the reference voltage is 10 volts so that 5 volts is applied to each of primary windings 12 and 22 as reference voltage, and let us also assume the input signal is 2 volts thus applying 1 volt of signal to each of windings 11 and 21. Let us also assume the input signal is of the same phase as the reference voltage in transformer 10 as shown in the diagram. Since the voltages in the two primary windings 11 and 12 add algebraically the voltage developed across each half of the secondary winding 13 is 6 volts. At the same time the voltages applied to transformer 20 are out of phase and the algebraic sum is 4 volts which is developed across each half of the secondary winding 23. The center taps of the two secondary windings being tied together are at the same potential, and with respect to the center taps the top end of winding 13 is 6 volts positive and the top end of winding 23 is 4 volts positive. Due to the difference in potential developed on the two secondaries the currents flowing in the two circuits will not be equal, therefore the potential drops developed across resistors 32 and 42 will be unequal and a D. C. voltage difference will appear at the output terminals 56 and 57 of approximately 2 volts, with terminals 56 being positive with respect to terminal 57. Let us now assume the signal voltage has increased in magnitude until it is as large as the reference voltage. Now the potential developed across each half of secondary winding 13 will be 10 volts and the potential developed across each half of secondary winding 23 will be zero volts. Now only the circuit connected to winding 13 will conduct current and the D. C. output will be at a value of about 10 volts. This voltage is the maximum D. C. output which can be produced by this demodulator because of the limiting action of the circuit as will be explained.

In certain applications of a demodulator it is advantageous to limit the maximum D. C. output to prevent over driving the device connected to the output terminals of the demodulator, and one of the main objects of the applicant's invention is to provide a method of limiting the D. C. output to a predetermined maximum value. The previous paragraph discussed the operation of the device when the signal voltage was equal in magnitude to the reference voltage. Up to this point as the signal voltage increased in magnitude the D. C. output increased also, but an increase in the input signal magnitude in excess of the value of reference voltage does not increase the D. C. output. The maximum value of D. C. output is reached when the value of signal input is equal to the reference voltage. This can easily be shown by the assumption of further values of voltages. Assuming now the signal input has been increased to 12 volts with 6 volts on each primary winding 11 and 21. The voltage built up across each half of secondary 13 will be the algebraic sum of the reference voltage and the signal voltage, and will be 11 volts. The voltage built up across secondary 23 will also be the algebraic sum of the two voltages and since they are in phase opposition the sum will be a −1 volt considering the reference voltage to be positive. Thus with the instantaneous polarity as shown on the diagram, current will flow through rectifier 30 and junction 33 will become approximately 11 volts positive with respect to slider 35 due to the potential drop developed across resistor 32 and upper part of potentiometer 34. Current will also flow in the lower section of the demodulator but due to the reversal of polarity because of the strong signal voltage it will flow from the bottom of the winding 23 through rectifier 41, and resistors 42 and 34 back to the center tap. A positive potential, however, of approximately 1 volt will appear at junction 43 with respect to slider 35 due to the potential drop developed across resistors 42 and 34. The difference between the positive 11 volts at junction 33 and a positive 1 volt at junction 43 with respect to the center taps is the 10 volts maximum. The foregoing explanation shows the limiting action of the device. Thus no matter how strong the signal voltage becomes the D. C. output voltage will be limited to 10 volts under these conditions. This is due to the absolute magnitude of voltages developed on the secondaries. One method of changing the maximum D. C. output to fit varying circumstances would be in changing the magnitude of the reference voltage, as the larger the reference voltage, the larger the maximum possible D. C. output becomes. The voltage figures used in the preceding paragraph were assumed merely for explanation of circuit action and the actual values chosen for use in operation of the circuit would be according to circuit requirements.

In the foregoing explanation only one phase of signal voltage was considered, that where the signal voltage and reference voltage were in phase in transformer 10. Under these conditions the output potential at terminals 56 and 57 will be of a polarity such that terminal 56 is positive with respect to terminal 57. When the phase of the signal voltage reverses so that the signal voltage and the reference voltage are in phase in transformer 20 and of the opposite phase in transformer 10 the action of the demodulator will be similar to that previously described but the polarity of the output potential will be reversed so that terminal 57 will have a positive polarity with respect to terminal 56.

It will be apparent to those skilled in the art that the foregoing discussion referring to the adding or cancelling of reference and signal voltages is actually accomplished by the adding or cancelling of the flux fields built up in the transformer by the respective primary windings.

In summary, the demodulator may be seen to include two full wave center tapped rectifier circuits with their outputs summed. There are two primaries to each transformer, one primary carrying a reference voltage, and one the signal voltage of same frequency which adds to the reference voltage in one transformer and subtracts in the other. Thus the output of one rectifier circuit is approximately half the reference voltage plus half the signal voltage and the output of the other rectifier circuit is approximately half the reference voltage minus half the signal voltage. The difference voltage which appears across the output terminals, is approximately equal to the signal in magnitude, but is a D. C. voltage. Thus the output voltage is proportional to the signal voltage up to the limiting value. When the signal exceeds the reference voltage, the output will no longer increase but will remain constant at the reference level, thus providing protection for succeeding equipment.

In general, while I have shown certain specific embodiments of my invention, it is to be understood that this is for the purpose of illustration and that my invention is to be limited solely by the scope of the appended claims, in which I claim as my invention:

1. Apparatus for comparing a variable alternating voltage with a standard alternating voltage comprising in combination; transformer means having primary windings adapted to be connected to said variable alternating voltage and to said standard alternating voltage and having two secondary windings, across one of which appears a voltage dependent upon the sum of said voltages and across the other of which appears a voltage dependent upon the difference between said voltages; means connected to said secondary windings and deriving from said sum and difference voltages direct voltages, with respect to a common point, which vary in magnitude with variation in the amplitude and reversal in the phase of said variable alternating voltage; and means connecting said direct voltages in a circuit to give a resultant direct voltage output thereby, the magnitude and polarity of which is determined by the difference of said derived voltages.

2. Apparatus for comparing a variable alternating voltage with a standard alternating voltage comprising in combination; transformer means having primary windings adapted to be connected to said variable alternating voltage and to said standard alternating voltage and having two secondary windings, across one of which appears a voltage dependent upon the sum of said voltages and across the other of which appears a voltage dependent upon the difference between said voltages; rectifying means connected to said secondary windings and deriving from said sum and difference voltages direct voltages, with respect to a common point, which vary in magnitude with variation in the amplitude and reversal in the phase of said variable alternating voltage; and means connecting said direct voltages in a circuit to give a resultant direct voltage output thereby, the magnitude and polarity of which is determined by the difference of said derived voltages.

3. Apparatus for comparing a phase reversible variable alternating voltage with an alternating reference voltage comprising in combination; transformer means having primary windings adapted to be connected to said phase reversible alternating voltage and to said alternating reference voltage and having two secondary windings, across one of which appears a voltage dependent upon the sum of said voltages and across the other of which appears a voltage dependent upon the differences between said voltages; full wave rectifying means connected to said secondary windings and deriving from said sum and difference voltages direct voltages, with respect to a common point, which vary in magnitude with variation in the amplitude and reversal in the phase of said variable alternating voltage; and means connecting said direct voltages in a circuit to give a resultant direct voltage output thereby, the magnitude and polarity of which is determined by the difference of said derived voltages.

4. Apparatus for comparing a variable alternating voltage with an alternating reference voltage comprising in combination; transformer means having primary windings adapted to be connected to said variable alternating voltage and said alternating reference voltage and having two secondary windings, across one of which appears a voltage dependent upon the sum of said voltages and across the other of which appears a voltage dependent upon the difference between said voltages; full wave rectifying means connected to said secondary windings and deriving from said sum and difference voltages two direct voltages, with respect to a common point, which vary in magnitude with variation in the amplitude and reversal in the phase of said variable alternating voltage; and means connecting said two derived voltages in a circuit to give a resultant direct voltage output thereby, the magnitude and polarity of which is determined by the difference of said two derived voltages.

5. In a demodulator; transformer means; a source of reference voltage; a source of signal voltage; transformer means having primary windings adapted to be connected to said source of signal voltage and to said source of reference voltage and having two secondary windings, across one of which appears a voltage dependent upon the sum of said voltages and across the other of which appears a voltage dependent upon the difference between said voltages; means connected to said secondary windings and deriving direct voltages from the sum and difference voltages; and means connecting said derived voltages in a circuit to give a resultant direct voltage output thereby the magnitude and polarity of which is determined by the difference of said derived voltages.

6. In a demodulator; transformer means; a source of reference voltage; a source of signal voltage; transformer means having primary windings adapted to be connected to said source of signal voltages and to said source of reference voltage and having two secondary windings, across one of which appears a voltage dependent upon the sum of said voltages and across the other of which appears a voltage dependent upon the difference between said voltages; rectifier means connected to said secondary windings and deriving direct voltages from the sum and difference voltages; and means for connecting said derived voltages in a circuit to give a resultant direct voltage output thereby the magnitude and polarity of which is determined by the difference of said derived voltages.

7. In a demodulator; transformer means; a source of alternating reference voltage; a source of alternating signal voltage of variable magnitude; transformer means having primary windings adapted to be connected to said alternating reference voltage and to said alternating signal voltage of variable magnitude and having two secondary windings, across one of which appears a voltage dependent upon the sum of said voltages and across the other of which appears a voltage dependent upon the difference between said voltages; rectifier means connected to said secondary windings and deriving two direct voltages, one from the sum voltage and the second from the difference voltage; and means for connecting said two derived voltages in a circuit to give a resultant direct voltage output thereby the polarity of which is determined by the phase of the signal voltage and the magnitude of which is proportional to the magnitude of the signal voltage up to a given value, and said magnitude of said output voltage remaining constant for all values of signal voltage in excess of said given value.

8. In a demodulator; transformer means; a source of alternating reference voltage; a source of alternating signal voltage; transformer means having primary windings adapted to be connected to said source of alternating reference voltage and to said source of alternating signal voltage and having two secondary windings, across one of which appears a voltage dependent upon the sum of said voltage and across the other of which appears a voltage dependent upon the difference between said voltages; rectifier means connected to said secondary windings and deriving direct voltages from the sum and difference voltages; and means for connecting said derived voltages in a circuit to give a resultant direct voltage output, the polarity of the output voltage being determined by the phase of the signal voltage and the magnitude of said output voltage being proportional to the magnitude of said signal voltage up to a given value, and said magnitude of said output voltage remaining constant for all values of signal voltage in excess of said given value.

9. In combination; first and second transformers, each of said transformers having a first and a second primary winding and a center tapped secondary winding, across which appears a voltage dependent either on the sum or the difference of said voltages; means for connecting the first of said primary windings in series to a source of alternating reference potential; means for connecting the second of said primary windings in series to a source of alternating signal potential; said primary windings so connected that when the signal voltage is of a phase to be aiding the reference voltage in said first transformer it is opposing the reference voltage in said second transformer; means directly connecting said center taps; first, second, third and fourth rectifying devices having the cathodes of the first and second rectifiers connected together and the cathodes of the third and fourth rectifiers connected together, the anodes of said first and second rectifiers being directly connected to opposite terminals of said secondary winding of said first transformer, and the anodes of said third and fourth rectifiers being directly connected to opposite terminals of said secondary winding of said second transformer; impedance means connecting the cathodes of said first and second rectifiers and the cathodes of said third and fourth rectifiers to said center taps; and an output circuit; the polarity of the output potential determined by the phase of the signal potential and the magnitude of the output potential being proportional to the magnitude of said signal potential up to a given value, and said magnitude of said output remaining constant for all values of signal potential in excess of said given value.

10. A full wave phase sensitive demodulator comprising in combination: first, second, third and fourth rectifying means; first and second transformers, each of said transformers having a first and second primary winding, and a center tapped secondary winding across which appears a voltage dependent either on the sum or the difference of the voltages applied to said primary windings; said center taps being directly connected to a common point; said rectifying means being connected in pairs such that the cathodes of each pair are connected together and the anodes of the first and second pair of rectifying means are connected to the opposite terminals of the secondary windings of the first and second transformers respectively; impedance means connecting said cathodes of said first and second rectifiers and said cathodes of said third and fourth rectifiers to said center taps; means connecting said first primary windings in series, and means for connecting said first primary windings to a source of alternating reference voltage; means connecting said second primary windings in series; and means for connecting said sceond primary windings to a source of alternating signal potential; said demodulator having a signal potential/output potential characteristic including a first portion wherein the output potential varies proportionally to the input potential to a predetermined value and a second portion where the output potential remains constant as the input potential exceeds said predetermined value.

References Cited in the file of this patent

UNITED STATES PATENTS

| 2,409,970 | Agins | Oct. 22, 1946 |
| 2,426,204 | Greig | Aug. 26, 1947 |
| 2,454,807 | Kennedy | Nov. 30, 1948 |
| 2,553,294 | Blewett | May 15, 1951 |